United States Patent
Cosentino et al.

(12) 
(10) Patent No.: US 6,287,658 B1
(45) Date of Patent: Sep. 11, 2001

(54) FLEXIBLE COMPOSITE SUITABLE AS PACKAGING MATERIAL

(75) Inventors: Steven R. Cosentino, Quinton; Wesley K. Seiverd, Chesterfield, both of VA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/393,913

(22) Filed: Sep. 10, 1999

(51) Int. Cl.⁷ .................................................. C09J 7/02
(52) U.S. Cl. ........................ 428/40.1; 206/411; 283/81; 428/40.7; 428/41.3; 428/41.5; 428/41.9; 428/352; 428/354; 428/421; 428/422; 428/906
(58) Field of Search .................................. 428/40.1, 40.7, 428/41.3, 41.5, 41.9, 354, 352, 422, 421, 906; 283/81; 206/411

(56) References Cited

U.S. PATENT DOCUMENTS

| 4,188,442 | 2/1980 | Asakura et al. |
| 4,513,059 | 4/1985 | Dabroski |
| 5,451,440 | 9/1995 | Tynan, Jr. |
| 5,942,299 | 8/1999 | Tynan, Jr. et al. |
| 6,074,747 * | 6/2000 | Scholz ................... 428/352 |

FOREIGN PATENT DOCUMENTS

| 3538102 * | 4/1987 | (DE) . |
| 0 353 907 | 2/1990 | (EP) . |

* cited by examiner

Primary Examiner—Nasser Ahmad
(74) Attorney, Agent, or Firm—Andrew G. Golian

(57) ABSTRACT

A wound roll suitable as a packaging material contains in order a release coating, a flexible polyester film, an adhesive, a flexible polymeric film support and a cold seal adhesive.

23 Claims, 1 Drawing Sheet

FLEXIBLE COMPOSITE SUITABLE AS PACKAGING MATERIAL

BACKGROUND OF THE INVENTION

The present invention is directed to a flexible packaging composite suitable for storage in roll form having on opposite sides of the composite (which are in contact with one another in roll form) a coating of a release composition formed from a water-soluble or water-dispersible formulation and a coating of a cold seal adhesive.

Cold seal adhesives (CSA), typically acrylic and rubber latex based, have been widely used to close food packages containing heat-sensitive foods such as chocolate bars and candies where heat sealing of the package is not desirable. Cold seal adhesives are typically coated or printed onto a flexible packaging film to allow sealing of the package with pressure. High package production rates are now achieved with cold seal technology, and this has resulted in high growth and increased popularity for packaging snack-foods.

Oriented polypropylene (OPP) film is widely used in cold seal packaging structures. OPP film manufacturers have developed co-extruded films comprised of a cold seal receptive layer, a core layer, and a cold seal release layer and other related structures. These films offered improvement in cold seal release while maintaining low package manufacturing costs. However, CSA manufacturers have continued their developments due to demand for better package sealing features that are required for new applications. These developments include more aggressive adhesives and adhesives that enabled higher packaging rates and reduced package costs. OPP films have not been able to consistently meet the need for a packaging film that can be efficiently unwound at the high line-speeds required by package converters.

Package printers and converters have overcome these limitations to some extent by a combination of the following actions: reducing roll unwinding speeds; utilizing less aggressive CSA's; or lowering CSA coat-weight. These actions increase costs or restrict packaging usefulness by limiting the sealing properties.

Additionally, some package converters are over-coating the outer surface which does not contain the cold seal adhesive with a cold seal release lacquer. These release lacquers usually require an additional processing step (U.S. Pat. No. 5,466,734) and may contain volatile organic solvents and ultimately increase costs. Release lacquer formulations may contain silicone compounds or other release agents. Although these compounds may give acceptable cold seal release properties, they are not preferred due to a tendency to perform inconsistently. Another problem is that these release agents, depending on environmental storage conditions, may migrate, transfer, and contaminate the surface of some cold seal adhesives and reduce bond integrity and sealing performance. Also, silicone compounds, if utilized in release lacquers, can wipe-off and contaminate packaging machinery and reduce the coefficient of friction (COF) of packaging films to the extent that film tension control, film tracking, and filled package handling can be negatively affected. Various fluorochemical release coatings have been evaluated; in general, these release materials are very expensive and suffer from poor adhesion to plastic packaging films; this results in transfer and deadening of the CSA.

Other limitations of existing CSA release films are related to poor dimensional and thermal stability. High drying temperatures are required by converters and printers to evaporate the water and remove residual volatile organic compounds (VOC) from the CSA; however, this causes web distortion and registration difficulties with OPP webs due to stretching and shrinkage of the substrate. VOC's must be removed to ensure good seal integrity and reduce chances of adding unwanted odors or contamination to the food.

Roll storage environmental conditions and the pressure created by the roll winding tension can cause blocking, or an interaction between the CSA and an opposite surface of the film. The roll is subsequently unwound at high manufacturing speeds where the following problems may occur: "legging"or stringing of the CSA; transfer of the release agent (1) to the CSA; tearing, stick/release, or "wrap-ups"of the entire laminate; unwanted noise generation as the surfaces of the roll are separated. There is a need for a packaging film that gives improved high speed release of CSA's when rolls are unwound at high speed.

SUMMARY OF THE INVENTION

The present invention is directed to a wound roll of a flexible composite suitable as a packaging material comprising in order:

(a) a release layer formed from a water-soluble or water-dispersible composition comprising a perfluoroalkyl acrylate polymer and a film forming polymer wherein the perfluoroalkyl acrylate polymer is present in an amount of from 5 to 100% by weight of the film forming polymer (b) a flexible polyester support for the release layer;

(c) an adhesive;

(d) a flexible polymeric film support;

(e) a cold seal adhesive, wherein the release layer and cold seal adhesive contact one another in the wound roll.

DETAILED DESCRIPTION OF THE INVENTION

The present invention describes a composite containing a cold seal release coating applied from an aqueous dispersion or solution of a perfluoroalkyl copolymer and a film forming polymer which can be coated in-line onto a polyester base. The coating preferably has little or no volatile organic compounds with the property of giving high speed release to a cold seal adhesive which is present supported upon a film on an opposite side of the composite from the cold seal release coating. The coated polyester base with the cold seal release coating and the film with the cold seal adhesive are joined together through an intermediate adhesive layer.

Figure 1:
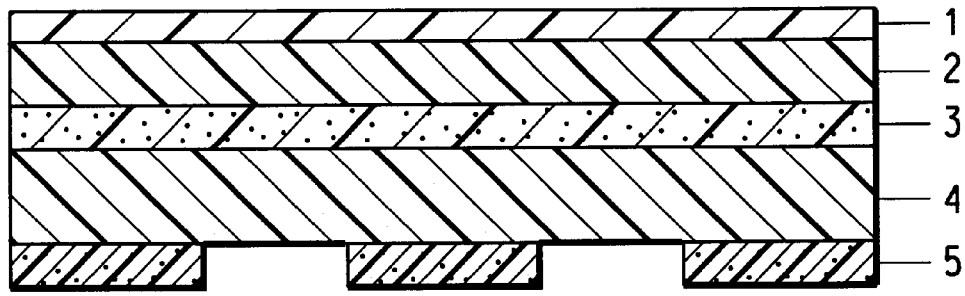
FIG. 1 depicts the minimum layers of a packaging composite of the present invention containing a cold seal release coating, a polyester film, an adhesive, a support film and a cold seal adhesive coating.
Figure 2:
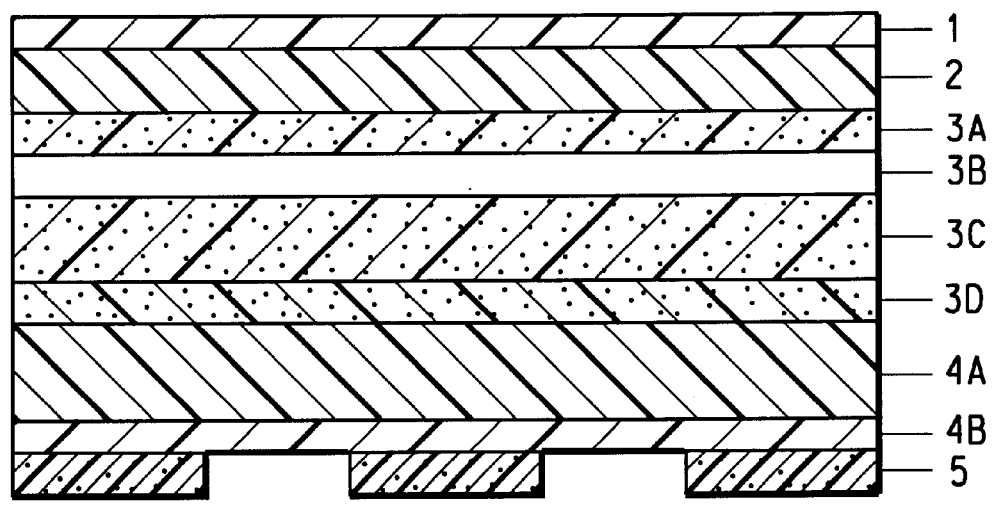
FIG. 2 depicts the FIG. 1 embodiment with the addition of intermediate layers which can be employed in an alternate embodiment.

As shown in FIG. 1 and FIG. 2 a cold seal release coating 1 is present on an outer surface of a composite. The cold seal release coating is required to contain a water-dispersible perfluoroalkyl polymer and a water-dispersible or water-soluble film forming polymer.

The water-dispersible perfluoroalkyl acrylate polymer, which may be a homopolymer or copolymer, typically contains 3 to 12 carbon atoms in the perfluoroalkyl group, more generally 3 to 10 carbon atoms and preferably 3 to 8 carbon atoms. The alkyl, i.e., the alkylene portion, likewise typically contains 3 to 12 carbon atoms, more generally 3 to 10 carbon atoms and preferably 3 to 8 carbon atoms.

A suitable comonomer useful in forming perfluoroalkyl acrylate copolymers includes vinyl acetate.

The water-dispersible perfluoroalkyl acrylate polymer will be employed of from 5 to 100% by weight based on the concentration of a required second component of the release coating, namely a film forming polymer. A preferred concentration is 10 to 60% by weight and more preferably 20 to 40%. This gives optimum balance of coating solution application and film-forming properties, release properties, and cost. For more release, the perfluoroalkyl acrylate copolymer component is increased; for lower cost with less release, the perfluoroalkyl acrylate copolymer component is decreased within the range initially stated above. Examples of suitable perfluoroalkyl acrylate homopolymers and copolymers are disclosed in U.S. Pat. No. 4,513,059 although this patent discloses a lower concentration of the acrylate polymer in a release coating composition (as well as a different support film).

A further required constituent in release layer 1 is an aqueous soluble or aqueous dispersible film forming polymer. A preferred polymer is polyvinyl alcohol. Other film forming polymer solutions and emulsions could be used as a substitute or in combination with the polyvinyl alcohol, such as cationic and nonionic starches, polyvinyl acetate emulsions, polyamide, polyvinyl pyrrolidone, poly (2-ethyl-2-oxazoline), polyvinyl dichloride emulsions, etc. Alternatively, cationic polymers typically used as retention aids as wet end paper sizes can also be employed as film-forming binders; examples of such compounds are polyethyleneimine solutions and copolymers of a quaternary acrylate salt and acrylamide.

Polyvinyl alcohol is preferred for the following reasons: broad chemical compatibility with other release formula components; good film-forming and binding efficiency; optimum release; excellent organic solvent resistance; good film coating and surface wetting properties; minimum human health hazard and risk of food contamination and odor; low manufacturing cost by minimizing amount of perfluoroalkyl acrylate copolymer required (acting as an extender resin); low requirement for additional release coating formulation additives (coalescent, surfactants, etc.). Additional suitable film forming polymers are disclosed in U.S. Pat. No. 4,513,059.

The concentration of film forming polymer is not considered critical provided the above stated concentration of perfluoroalkyl acrylate is used.

Other additives typically employed in aqueous coating compositions can be utilized, although not usually required. Examples are surfactants, defoamers, slip or coefficient of friction modifying agents (e.g., silica, clay, waxes), biocides, plasticizers (e.g., glycerine, ethylene glycol) and crosslinking agents (e.g., urea, melamine formaldehyde resins) and anti-static agents. A typical coat-weight of release coating is from 0.01 to 0.15 grams per square meter. A coating weight of 0.02 to 0.05 grams per square meter is preferred.

A significant discovery is the fact that the release layer can be directly in-line coated over a polyester support film 2 shown in FIGS. 1 and 2. Suitable polyesters include polyester terephthalate and polyester naphthalate. While an intermediate primer or adhesive layer could be employed, such use is generally undesirable since the bond strength is sufficient between the release layer and the polyester support.

A further layer which is employed in contact or adjacent the polyester film is an adhesive which is shown as 3 in FIGS. 1 and 2. FIG. 2 depicts construction 3 with a multitude of layers which can be present, namely adhesive 3A, printing graphics 3B, a further adhesive 3C and a primer 3D. Thus at least one adhesive layer is essential, a number of intermediate layers can be present. The adhesive which is employed is not considered critical; however, it will not interfere with the final composite being flexible to be wound into a roll. Examples of suitable laminating adhesives include aqueous or solvent based polyester, polyurethane, acrylic, polyamide, and other adhesive resins that are well known. Alternatively, the adhesive layer can be composed of an extruded layer of polyethylene, ionomer, polyester, and other copolymers.

A further layer shown in FIGS. 1 and 2 is a substrate film 4 which provides a support for the outer cold seal adhesive coating. The composition of the film is not considered critical with suitable examples including polypropylene, polyethylene, nylon, ionomer, polyester including blends or coextrusions of these films. FIG. 2 shows a further layer of primer 4A which is intermediate the substrate film and the cold seal adhesive coating.

The final outer coating layer is a cold seal adhesive which allows cohesive sealing by pressure at ambient temperatures. The term "cold seal" means the sealing at temperatures not greater than 65° C. The term "cold seal adhesive" as used herein means a substance which is non-tacky to non-similar substrates but requires another cold seal adhesive material to be placed on an adjacent surface for bonding and adhesion. The cold seal adhesive used herein is non-tacky to equipment and all other surfaces having a non-similar substrate. Therefore, the cold seal adhesive requires no protection of equipment to prevent buildup of unwanted adhesive. A cold seal adhesive requires a minimal pressure to contactingly and bondingly engage to the similar adhesive. And, once the cold seal adhesive is engaged to the similar adhesive, the cold seal adhesive is not readily releasable. Accordingly, the cold seal adhesive differs from other adhesives, such as, for example, a pressure sensitive adhesive. Suitable cold seal adhesives include natural or synthetic rubber compounds, acrylic resins, vinyl acetate-ethylene emulsions.

To further illustrate the present invention the following examples are provided. All temperatures are in centigrade unless otherwise indicated.

Preparation of Release Coating

A 400 lb. (approximately 50 gallons) batch is prepared as follows:

Charge 333 lbs. (40 gallons) of deionized water to a mixing tank.

Add 39 lbs. of polyvinyl alcohol flakes* while agitating vigorously for 20 minutes or until all flakes are well dispersed While stirring, elevate solution temperature to 85° C. and hold for 30 minutes, or until all polyvinyl alcohol flakes are dissolved.

Allow polyvinyl alcohol solution to cool to room temperature.

When cool, add 32 lbs. (2.43 gallons) of water dispersible perfluoroalkyl acrylate copolymer** to the batch while stirring.

Stir for 20 minutes.

*AIRVOL® 203 polyvinyl alcohol (PVOH) (87–89% degree of hydrolysis, molecular weight 13,000 –23,000, from about 150 to about 400 degree of polymerization) from Air Products and Chemicals, **SCOTCHBAN® FC-845, perfluoroalkyl acrylate copolymer containing 35 to 40 weight percent fluorine, produced by the copolymerization of ethanaminium, N,N, N-trimethyl-2-[(2-methyl-1-oxo-2-propenyl)-oxy]-, chloride; 2-propenoic acid, 2-methyoxiranyl-methyl ester; 2-propenoic acid, 2-ethoxyethylester; and 2-propenoic acid from Minnesota Mining and Manufacturing.

To prepare a final composite of the present invention the following procedure is suitable.

A polyethylene terephthalate film is formed by casting polyethylene terephthalate polymer through a slot die onto a chilled quench roll and stretching in a machine direction at a stretch ratio of 3.4:1, then in-line coated with the release coating (stated above) using a direct gravure coater. The coating is then dried at 110°0 C. and the film stretched in a traverse direction at a stretch ratio of 4.0:1. The film is then heat set at 230° C. to lock in the strength, toughness, and impart thermal stability to a 12 micron polyethylene terephthalate release coated film. A coatweight of the dried release coating is 0.045 grams per square meter.

To produce a flexible composite, a two-part polyester-urethane laminating adhesive is gravure coated onto the side of polyester film opposite to the release coating with ethyl acetate as solvent in the adhesive mix. The adhesive coating weight is 1.2–1.5 pounds/ream (3000 square feet). The laminating adhesive is then dried and cured in a heated air oven, and then laminated to the oriented polypropylene. A cold seal adhesive is then gravure printed onto the oriented polypropylene layer of 3 pounds/ream coatweight. C1380 adhesive from ATO Findley is used. The cold seal adhesive is a water-based blend of synthetic and natural latex adhesives with a solids content of 57 weight percent. The cold seal adhesive coated composite is then dried in an heated oven to evaporate the water and cure the cold seal adhesive. The laminated composite with the cold seal adhesive on one surface and the release layer on the other surface is then wound into a roll for subsequent processing into packages.

Release Coating/Cold Seal Adhesive Contact

For testing purposes, a cold seal adhesive namely C1380 from Ato Findley, Inc., which is a CSA widely used in flexible packaging applications.

Initial Peel Strength—The cold seal adhesive is coated onto an untreated 12 micron polyethylene terephthalate film (Melinexe® 800, DuPont Polyester Films) with a #3 Meyer bar at a coat-weight of about 3.0 lb/ream (3000 square feet per ream). The adhesive is cured in a circulating air oven set at 93° C. for 30 seconds. The adhesive coated film is pressure sealed against the release-coated surface with a Sentinel heat sealer with the pressure set at 80 psi for a 0.5 second dwell time. The sample is then conditioned at room temperature for 16 hours. The force that is required to separate the cold seal adhesive from the cold seal release surface is measured with an Instron tester. Initial Peel Strength success criteria is less than 50 grams/inch width.

Block—This is an indicator of any increase in release force of cold seal adhesive coated rolls of packaging film under high temperature transportation and storage conditions. A test sample is prepared by the same method as for the Initial Peel Strength test. The sample is then aged in circulating air oven set at 50° C. for 16 hours and at 100 psi contact pressure. The force in grams per inch of width that is required to separate the cold seal adhesive from the cold seal release surface is measured on an Instron Tester. Block success criteria is less than 150 grams/inch width.

Unwinding Speed—Visually evaluated in the packaging converting or manufacturing plant by observing maximum obtainable unwinding speed without web tearing or "wrap ups", or picking ("legging") of the CSA. Noise generation as the film surfaces are separated at high speed is also considered.

Offset Contamination—An evaluation of any removal or transfer of the cold seal release coating to the cold seal adhesive. After completion of the Blocking test, contamination is evaluated by sealing the cold seal adhesive surface to itself with a Sentinel heat sealer and then manually evaluating the force required to separate the adhesive. Any reduction in force vs. a control sample that has not been heat aged according to the Block test method indicates contamination of the adhesive. Success criteria is no noticeable reduction in release force.

Web Tracking and Package Handling—This property is related to the coefficient of friction of the release coated surface; this is important in controlling packaging film in processing machinery and the controlled movement of filled packages. Excessively high or low COF can result in web tension control difficulties, slippage and scratching of films, and poor control and handling of filled packages. Web Tracking and Package Handling is evaluated by observing web alignment, printing registration, package forming and sealing efficiency, and filled package ease of movement through the process.

Overall Rating as a Release Film—A sum total grade of the above properties, from a package converter standpoint, indicating functionality as a cold seal release film that can be processed at high unwinding speeds.

DETAILED EXAMPLES

Cold seal release films were prepared from the following cold seal release coating compositions:

| Release Coating Ingredients | Release Coating Formula 1 | Release Coating Formula 2 | Release Coating Formula 3 (Comparative Example 5) |
|---|---|---|---|
| De-ionized Water | 333 lbs. | 333 lbs. | 333 lbs. |
| PVOH (87% hydrolysis)* | 39 lbs. | 39 lbs. | 39 lbs. |
| Perfluoroalkyl acrylate copolymer (34% solids)** | 32 lbs. | 40 lbs. | 0 |
| Polyethylene Wax Emulsion (34% solids)+ | 0 | 0 | 32 lbs. |
| Total Batch Weight | 403 lbs. | 411 lbs. | 403 lbs. |
| Ratio (%)^ | 28 | 35 | — |
| Solids (%) | 12.4 | 12.8 | 12.4 |

*AIRVOL ® 203, Air Products and Chemicals, Inc.

-continued

| Release Coating Ingredients | Release Coating Formula 1 | Release Coating Formula 2 | Release Coating Formula 3 (Comparative Example 5) |

**SCOTCHBAN ® FC-845, 3 M Speciality Chemicals
+JONWAX ® 120 by S. C. Johnson & Son, Inc.
ˆDefined as dry weight of perfluoroalkyl acrylate copolymer per dry weight of film-forming polymer; expressed as %.

For comparative purposes, the following were evaluated:

Comparative Example 1—A commercially available Cold Seal Release Oriented Polypropylene film ('RLS'—AET Packaging Films, Inc.)

Comparative Example 2—A commercially available Cold Seal Release Oriented Polypropylene film ('BETS'—Vifan Canada, Inc.)

Comparative Example 3—An uncoated 12 micron PET (Melinex® 800, DuPont Polyester Films)

Comparative Example 4—A commercially available silicone emulsion release coating was in-line coated on 12 micron PET film in the same manufacturing process as described in Examples 1–3 above.

Comparative Example 5—A commercially available release agent, a parrafin/polyethylene emulsion, was blended with the PVOH film-forming polymer and in-line coated on a 12 micron PET film in the same manufacturing process as described in Examples 1–3 above.

EVALUATION OF RELEASE COATED FILMS

| Sample | Release Surface | Release Coating Dry Thickness (grams/m$^2$) | Initial Peel Strength (grams/inch) | Block (grams/inch) | Unwinding Speed | Web Tracking and Package Handling | Offset Contamination | Overall for Cold Seal Release |
|---|---|---|---|---|---|---|---|---|
| 1 | Formula 1 | 0.045 | 20 | 61 | ◯ | ◯ | ◯ | ◯ |
| 2 | Formula 2 | 0.045 | 18 | 37 | ◯ | ◯ | ◯ | ◯ |
| Comp. Ex. 1 | OPP | — | 36 | 64 | Δ | Δ | ◯ | Δ |
| Comp. Ex. 2 | OPP | — | 50 | 85 | Δ | Δ | ◯ | Δ |
| Comp. Ex. 3 | None | — | 96 | 159 | Not tested | ◯ | ◯ | X |
| Comp. Ex. 4 | Silicone | 0.03 | 15 | 41 | ◯ | X | Δ | X |
| Comp. Ex. 5 | Formula 3 | 0.045 | >300 | >300 | Not tested | Not tested | ◯ | X |

Samples tested with C1380 Cold Seal Adhesive (ATO Findley, Inc.) at 3.0 lbs/ream coat-weight
X - unacceptable performance
◯ - acceptable performance
Δ - marginal performance

What is claimed is:

1. A wound roll of a flexible composite suitable as a packaging material comprising in order:
    (a) a release coating formed from a water-soluble or water-dispersible composition comprising a perfluoroalkyl acrylate polymer and a film forming polymer wherein the perfluoroalkyl acrylate polymer is present in an amount of from 5 to 100% by weight of the film forming polymer and wherein the film forming polymer is selected from the group consisting of polyvinyl alcohol, starch, polyvinyl acetate, polyamides, polyvinyl pyrrolidone, poly (2-ethyl-2-oxazoline), polyvinyl chloride, and polyethyleneimine;
    (b) a flexible polyester support for the release layer;
    (c) an adhesive;
    (d) a flexible polymeric film support;
    (e) a cold seal adhesive, wherein the release layer and cold seal adhesive contact one another in the wound roll.

2. The wound roll of claim 1 wherein the perfluoroalkyl acrylate polymer of (a) is present in an amount of from 10 to 60% by weight.

3. The wound roll of claim 2 wherein the amount is from 20 to 40% by weight.

4. The wound roll of claim 1 wherein the film forming polymer is polyvinyl alcohol.

5. The wound roll of claim 1 wherein the release layer of (a) and the flexible polyester support of (b) contact one another.

6. The wound roll of claim 1 wherein the flexible polyester support of (b) is polyethylene terephthalate or polyethylene naphthalate.

7. The wound roll of claim 1 wherein the flexible polyester support is polyethylene terephthalate.

8. The wound roll of claim 1 wherein the adhesive of (c) is selected from the group consisting of polyester, polyurethane, acrylic, polyamide, polyethylene and ionomer.

9. The wound roll of claim 8 wherein the adhesive is melt-extruded polyethylene.

10. The wound roll of claim 1 wherein the flexible polymer support of (d) is selected from the group consisting of polyethylene, polypropylene, nylon ionomer and polyester.

11. The wound roll of claim 10 wherein the flexible polymer support of (d) is oriented polypropylene.

12. The wound roll of claim 1 wherein the cold seal adhesive of (e) is selected from the group consisting of natural or synthetic rubber, acrylic and vinyl-ethylene acrylic.

13. A wound roll of a flexible composite suitable as a packaging material comprising in order:
    (a) a release coating formed from a water-soluble or water-dispersible composition comprising a perfluoroalkyl acrylate polymer and a film forming polymer wherein the perfluoroalkyl acrylate polymer is present in an amount of from 5 to 100% by weight of the film forming polymer;

(b) a flexible polyester support for the release layer;

(c) an adhesive which is melt extruded polyethylene;

(d) a flexible polymeric film support;

(e) a cold seal adhesive, wherein the release layer and cold seal adhesive contact one another in the wound roll.

14. The wound roll of claim 13 wherein the perfluoroalkyl acrylate polymer of (a) is present in an amount of from 10 to 60% by weight.

15. The wound roll of claim 14 wherein the amount is from 20 to 40% by weight.

16. The wound roll of claim 13 wherein the release layer of (a) and the flexible polyester support of (b) contact one another.

17. The wound roll of claim 13 wherein the flexible polyester support of (b) is polyethylene terephthalate or polyethylene naphthalate.

18. The wound roll of claim 13 wherein the flexible polyester support is polyethylene terephthalate.

19. The wound roll of claim 13 wherein the adhesive of (c) is selected from the group consisting of polyester, polyurethane, acrylic, polyamide, polyethylene and ionomer.

20. The wound roll of claim 19 wherein the adhesive is melt-extruded polyethylene.

21. The wound roll of claim 13 wherein the flexible polymer support of (d) is selected from the group consisting of polyethylene, polypropylene, nylon ionomer and polyester.

22. The wound roll of claim 21 wherein the flexible polymer support of (d) is oriented polypropylene.

23. The wound roll of claim 13 wherein the cold seal adhesive of (e) is selected from the group consisting of natural or synthetic rubber, acrylic and vinyl-ethylene acrylic.

* * * * *